April 26, 1966 G. H. THOMAS ETAL 3,247,710
VIBRATION ANALYZING APPARATUS
Filed May 21, 1962 3 Sheets-Sheet 1
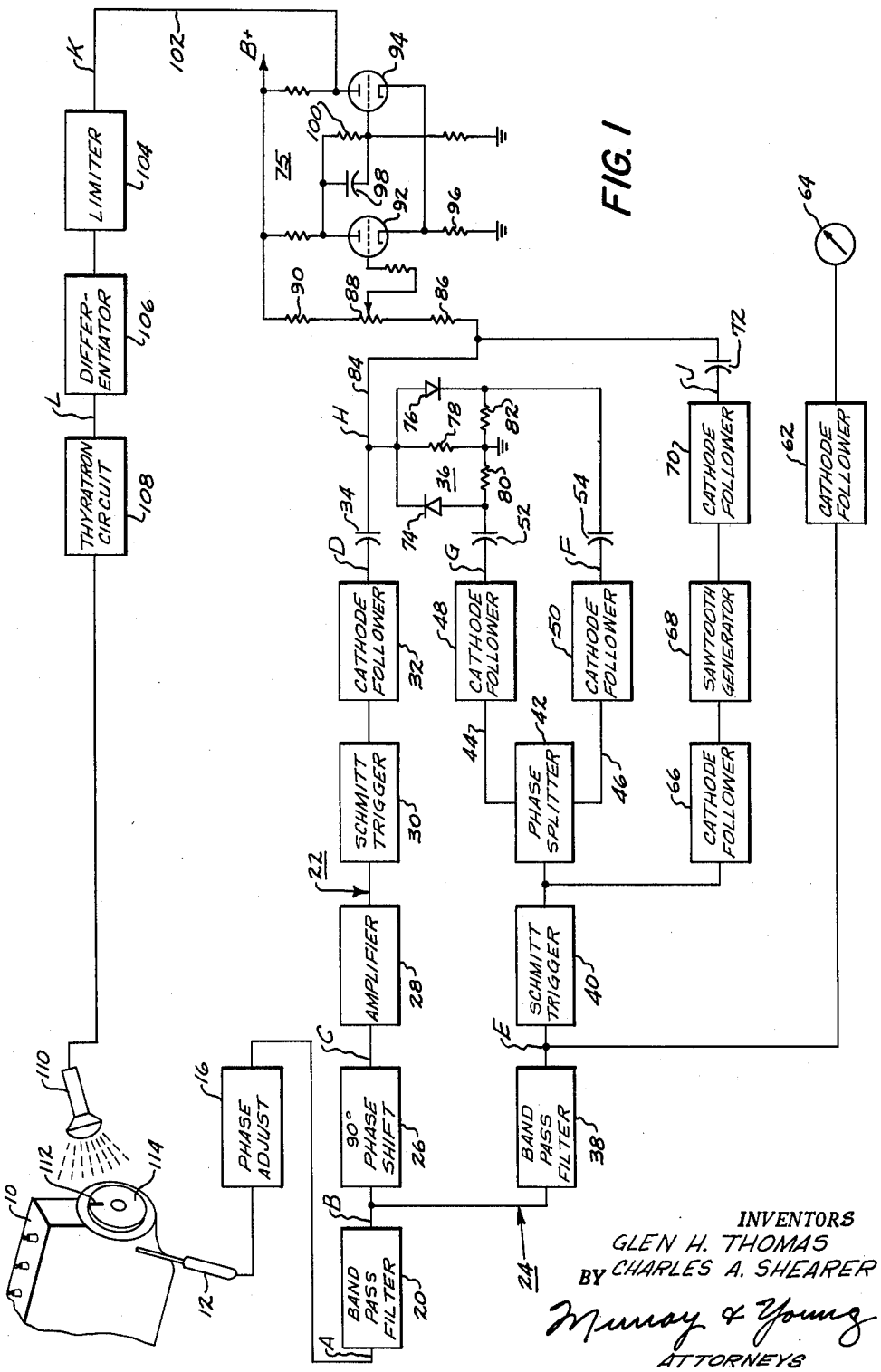
FIG. I
INVENTORS
GLEN H. THOMAS
CHARLES A. SHEARER
BY Murray & Young
ATTORNEYS April 26, 1966 G. H. THOMAS ETAL 3,247,710
VIBRATION ANALYZING APPARATUS
Filed May 21, 1962 3 Sheets-Sheet 2
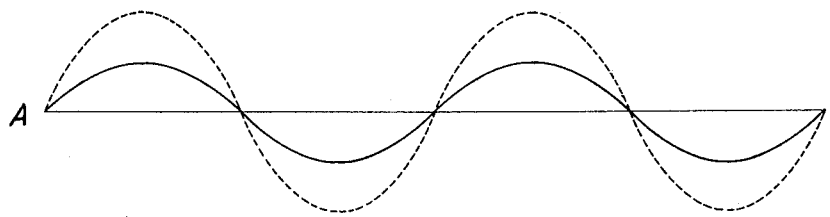
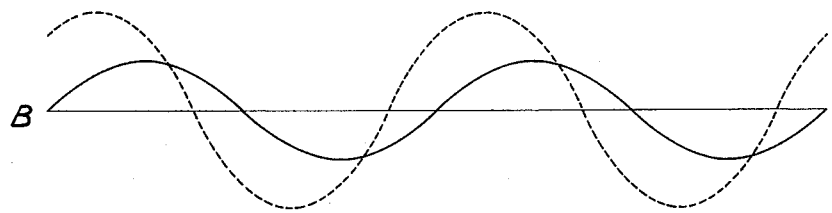
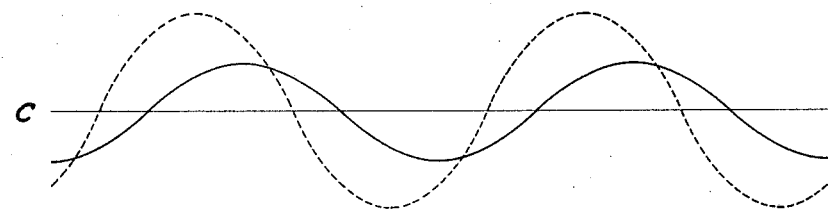
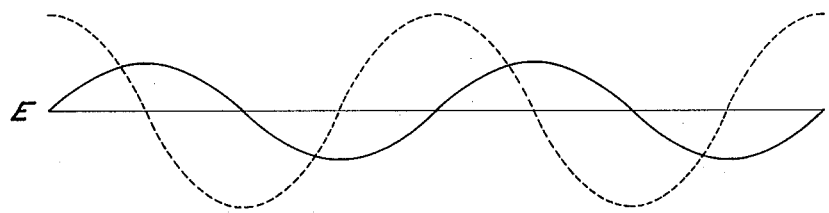
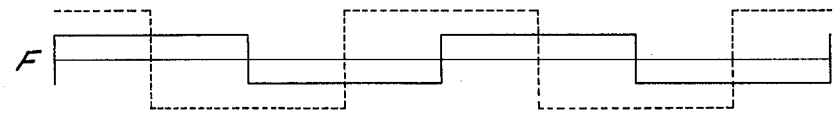
FIG. 2A
INVENTORS
GLEN H. THOMAS
BY CHARLES A. SHEARER
Murray & Young
ATTORNEYS April 26, 1966    G. H. THOMAS ETAL    3,247,710
VIBRATION ANALYZING APPARATUS
Filed May 21, 1962    3 Sheets-Sheet 3
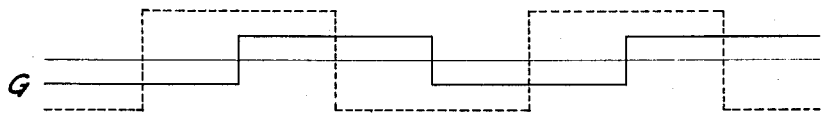
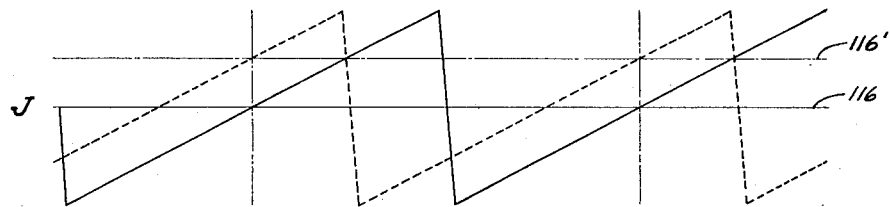
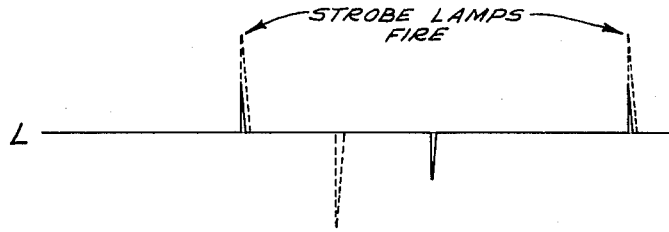
FIG. 2B
INVENTORS
GLEN H. THOMAS
CHARLES A. SHEARER
BY
ATTORNEYS United States Patent Office 3,247,710
Patented Apr. 26, 1966

3,247,710
VIBRATION ANALYZING APPARATUS
Glen H. Thomas, Columbus, and Charles A. Shearer, Westerville, Ohio, assignors to International Research and Development Corporation, Worthington, Ohio, a corporation of Ohio
Filed May 21, 1962, Ser. No. 196,351
13 Claims. (Cl. 73—71.4)

This invention relates to electronic vibration analyzing equipment for balancing rotating bodies and the like. More particularly, the invention relates to electronic vibration analyzing equipment for use in balancing internal combustion engines and other similar devices wherein the speed of a moving part cannot be accurately maintained at a fixed value.

As is known, the usual electronic vibration analyzer consists, in its simplest form, of an electromagnetic transducer or vibration pickup which transforms mechanical vibrations into an electrical signal having a frequency equal to that of the vibrations and an amplitude proportional to the magnitude of the vibrations. The resulting signal may then be used to (1) drive a displacement meter which visually displays the magnitude of the vibrations, (2) actuate an audible or visual alarm device when the magnitude of the vibrations exceeds a predetermined limit, and/or (3) periodically fire a stroboscopic lamp at the vibration frequency. If the vibrations are those from a single rotating part, the stroboscopic lamp will be fired once during each revolution of the part; and if the lamp is directed onto the rotating part, a visible mark on that part will appear to be stationary. By applying trial weights to the rotating part and observing the angular shift of the mark as viewed under the flashing stroboscopic lamp, the heavy point of the part causing the vibration can be located and its magnitude can be determined so that the unbalanced condition can be corrected.

It often happens that two or more sources of unbalance are present in a piece of equipment and are generating vibrations at different frequencies with the result that a composite electrical signal composed of several different frequencies is produced by the pickup. Consequently, it becomes necessary to employ a filter or the like which will separate a particular frequency from the different frequencies such that the stroboscopic lamp will fire at the frequency of only one vibration. The source of the vibrations at the frequency to which the filter is selectively tuned can then be determined by directing the stroboscopic lamp on the rotating part. Suitable balancing corrections for that source of unbalance can be effected by adding corrective weights or removing weight according to the indicated unbalance.

In the case of an internal combustion engine or the like, there may not only be several sources of unbalance; but, in addition, the speed of rotation of the various parts of the engine cannot be accurately controlled. That is, the speed of an engine with a throttle adjustment set for 1500 revolutions per minute may actually vary from this value by, say, plus or minus ten revolutions per minute. Consequently, the frequency of the alternating current signal passing through the aforesaid filter of the analyzing equipment will also vary. Since a phase shift occurs in a signal of varying frequency passing through a filter, the phase of the signal used to fire the stroboscopic lamp will also vary, meaning that in the absence of some type of phase correcting means, the stroboscopic lamp cannot be used to accurately balance the equipment.

The present invention is particularly adapted for use with balancing apparatus such as that shown and described in copending application Serial No. 83,445, filed January 18, 1961, and application Serial No. 55,049, filed September 9, 1960, now Patent No. 3,115,041. In the aforesaid applications, apparatus is described for two plane balancing of rotating bodies wherein it is necessary to make provision for the elimination of cross-effect. That is to say, in any two plane balancing method it is necessary to make some provision for assuring that the unbalance in one correction plane does not enter into the unbalance indication for the other correction plane, this condition being termed "cross-effect." For purposes of simplicity, the invention is described herein in connection with a system wherein cross-effect is not taken into account; however, it will be appreciated that the invention may be readily incorporated into such a two plane balancing system.

The principal objects of the invention include:

To provide means in vibration analyzing apparatus for compensating for a shift in phase of an alternating current signal passing through filter means, the alternating current signal having a varying frequency which varies as a function of the speed of a rotating part;

To provide means for generating a direct current control signal which varies as a function of the shift in phase of an alternating current signal passing through filter means; and To provide, in apparatus of the type adapted to produce a pulsed output signal in which each pulse is fixed in phase with respect to an alternating current input signal applied thereto, the improvement of means for compensating for a shift in phase of the alternating current signal in passing through a filter in the apparatus whereby the pulses in the output signal will always be fixed in phase with respect to said alternating current input signal.

In accordance with the invention, the means for compensating for a shift in phase of an alternating current signal in passing through a bandpass filter comprises a pair of signal channels coupled to the output of the bandpass filter, means in one of the channels for producing a first square-wave signal, means in the other of the channels for producing second and third square-wave signals each having a specified phase relationship with respect to the first square-wave signal, and means responsive to the first, second and third square-wave signals for producing a pulsed signal having a frequency corresponding to that of the alternating current signal, the pulses in the pulsed signal being fixed in phase with respect to the alternating current signal prior to its passage through the bandpass filter regardless of variations in the frequency of that alternating current input signal.

Preferably, the means responsive to the first, second and third square-wave signals comprises a phase comparator for generating a direct current control signal which varies as a function of the phase shift effected as the alternating current input signal passes through the aforesaid bandpass filter. This direct current control signal is, in turn, applied to a Schmitt trigger multivibrator circuit which also has applied thereto a sawtooth wave form having a specified phase relationship with respect to the input alternating current signal, depending upon the characteristics of the bandpass filter. As will hereinafter be seen, the direct current control voltage at the output of the phase comparator acts to vary the point along the voltage rise of the sawtooth wave form at which the Schmitt trigger multivibrator circuit fires, whereby the leading edge of each square wave at the output of the multivibrator will have the same phase relationship with respect to the input alternating current signal regardless of any phase shift effected by the bandpass filter. The leading edges of the square-wave signal, after passing through a differentiator, can then be used to fire a stroboscopic lamp or for other purposes.

The above and other objects of the invention will become apparent from the following detailed description by reference to the accompanying drawings, in which:

FIGURE 1 is a schematic circuit diagram of the apparatus of the invention; and

FIGS. 2A and 2B illustrate wave forms appearing at various points in the circuit of FIG. 1.

Referring now to the drawings, and particularly to FIG. 1, vibrations caused by the crankshaft, for example, of an internal combustion engine 10 are sensed by an electromagnetic transducer or vibration pickup 12. Suitable transducers for this purpose are described in U.S. Patent No. 2,754,435. The signal from the transducer 12 will be a composite oscillatory signal containing a plurality of sine waves, each of which has a frequency corresponding to the frequency of a particular vibrating part on the engine 10. This composite signal is passed through a calibration circuit 16 to a bandpass filter 20 which is tuned to pass a narrow band of frequencies centered around the frequency of a single vibrating part on the engine 10. If it is assumed, for example, that the crankshaft of the engine 10 is to be balanced and is rotating at a speed of 1500 revolutions per minute, the bandpass filter 20 will be adjusted to pass a narrow band of frequencies centered around 1500 cycles per minute. For purposes of simplicity, it will be assumed that there is no cross-effect between one end of the crankshaft and the other. In other words, the end of the crankshaft removed from that shown in the drawing will be perfectly balanced so that the vibrations picked up by the transducer 12 and which pass through filter 20 will be those due only to the unbalance at one end of the engine.

The output of the bandpass filter 20 is divided between two signal channels generally indicated at 22 and 24. In signal channel 22, the phase of the signal at the output of bandpass filter 20 is first shifted by 90° in a phase shift circuit 26 and thereafter passed through an amplifier 28 to a Schmitt trigger multivibrator circuit 30 which converts the sine wave output from amplifier 28 into a generally symmetrical square-wave signal having a frequency equal to that of the alternating current signal passing through the bandpass filter 20. The construction and operation of the Schmitt trigger circuit 30 will hereinafter be described in detail. From circuit 30, the square-wave signal passes through a cathode follower circuit 32 and capacitor 34 to a phase comparator circuit 36, hereinafter described in detail.

Reverting now to the signal channel 24, it includes a second bandpass filter 38 which is tuned to the same frequency as filter 20 (i.e., 1500 cycles per minute for the case assumed). From bandpass filter 38, the signal passes through a Schmitt trigger multivibrator circuit 40 where it is converted into a symmetrical square-wave signal having a frequency equal to that of the alternating current signal at the output of bandpass filter 38. From Schmitt trigger multivibrator circuit 40, the signal is applied to a phase splitter 42 which, in its simplest form, comprises a vacuum tube in which the input is applied to a control grid and two outputs are taken from the anode and cathode, respectively, whereby square-wave signals 180° out of phase with respect to each other will appear on leads 44 and 46. These signals are passed through cathode followers 48 and 50 and capacitors 52 and 54, respectively, to the phase comparator circuit 36.

The output of the bandpass filter 38 is applied through cathode follower 62 to an amplitude member 64. In this manner, the meter 64 will display the amplitude of the alternating current signal passing through filter 38; and since this amplitude is proportional to the magnitude of the vibrations from one single rotating part sensed by the transducer 12, the meter 64 will, in effect, indicate the magnitude of those vibrations.

The output of Schmitt trigger circuit 40, in addition to being applied to the phase splitter circuit 42, is also applied through cathode follower 66 to a sawtooth generator 68. The sawtooth output wave form from generator 68 is then applied through cathode follower 70 and capacitor 72 to the input of a Schmitt trigger circuit, generally indicated at 75. Thus, there are three Schmitt trigger circuits 30, 40 and 75 illustrated in FIG. 1.

As shown, the phase comparator circuit 36 includes a first diode 74 connected between capacitors 34 and 52, and a second diode 76 connected between capacitors 34 and 54. The diodes 74 and 76 are connected to conduct currents in opposite directions. Between the junction of diodes 74 and 76 and ground is a resistor 78, while resistors 80 and 82 connect the anode and cathode of diodes 74 and 76, respectively, to ground. With the arrangement shown, the diode 74 will conduct when the voltage at the output of circuit 32 is negative with respect to the voltage at the output of circuit 48. Similarly, the diode 76 will conduct when the voltage at the output of circuit 32 is positive with respect to the voltage at the output of circuit 50. If the voltages applied to circuit 36 are such that neither of the diodes 74 nor 76 conduct, then a direct current voltage will appear on output lead 84 from the B+ voltage source. If only diode 74 conducts, the voltage on lead 84 will be the algebraic sum of the voltages at the outputs of circuits 32 and 48. If only diode 76 conducts, the output voltage will be the algebraic sum of the voltages at the outputs of circuits 32 and 50; and if both of the diodes conduct, the voltage on output lead 84 will be the algebraic sum of the voltages at the outputs of circuits 32 and 48 plus the sum of the voltages at the outputs of circuits 32 and 50.

The resulting output signal on lead 84 is applied across a voltage divider comprising resistors 86, 88 and 90 connected in series between the junction of diodes 74 and 76 and a B+ voltage source. In this way, the output of circuit 36 is applied to the Schmitt trigger multivibrator circuit 75 as a bias voltage.

As shown, the Schmitt trigger multivibrator 75 comprises a pair of triodes 92 and 94 having their cathodes connected to ground through a common resistor 96. The anode of triode 92 is connected to the grid of triode 94 through the parallel combination of capacitor 98 and resistor 100. Under normal conditions, triode 94 will conduct while triode 92 will be cut off. When a positive voltage is applied to the grid of triode 92, however, it will begin conduction when the positive voltage applied thereto reaches a predetermined amplitude. Conduction in triode 92 will cut off triode 94 because of the fall in the plate voltage of triode 92 which is coupled to the grid of triode 94 through elements 98 and 100. Triode 92 will continue to conduct until the voltage level of the input signal applied to its grid falls below a second predetermined amplitude, at which time it will cut off and the triode 94 again conducts. Since the sawtooth output wave form of cathode follower circuit 70 is also applied to the grid of triode 92, the output appearing at the plate of triode 94 on lead 102 will be a series of positive square-wave pulses each of which has a leading edge determined by the point on the voltage rise of the sawtooth wave form at which the triode 92 begins conduction. Furthermore, this point along the voltage rise at which the triode 92 conducts can be varied by varying the direct current voltage on lead 84. That is, as the direct current voltage on lead 84 increases in a positive direction, the triode 92 will conduct sooner in time; whereas when the direct current voltage on lead 84 goes negative, the triode 92 will conduct at a later point.

The resulting output square wave from the plate of triode 94 is applied through lead 102 and a capacitor to limiter circuit 104 and differentiator 106. As is well known to those skilled in the art, a differentiator is a circuit in which the voltage amplitude at the output is proportional at any instant to the rate of change of voltage amplitude at the input. The voltage wave form appearing at the output of differentiator 106 will, therefore, be a series of sharp voltage pulses which occur in time at the points where the input square-wave signal changes from one voltage level to another. As the voltage changes in a positive direction, a sharp pulse is produced by the differentiator which is also positive, these sharp pulses occurring at the leading edges of the square-wave output signals from the Schmitt trigger multivibrator 75. These sharp pulses are, in turn, used to fire a thyratron circuit 108, the output of the thyratron being used to periodically fire a stroboscopic lamp 110 which will cause a mark 112 on the periphery of the engine crankshaft 114 to appear stationary when the firing rate of the stroboscopic lamp is equal to the rotational speed of the crankshaft.

Operation of the circuit of FIG. 1 may best be understood by reference to the wave forms shown in FIGS. 2A and 2B. The shape of the wave forms for the case where the vibrational frequency is exactly equal to the tuned frequency of bandpass filter 20 is illustrated by the solid lines in FIGS. 2A and 2B; whereas the shape of the wave forms occurring when the vibrational frequency varies slightly from the tuned frequency of filter 20 is shown by the dotted lines.

Taking, first, the case where the fundamental vibrational frequency is exactly equal to the tuned frequency of filter 20, the fundamental wave form A applied to the bandpass filter 20 will appear substantially as a sine wave. After passing through filter 20, the fundamental wave form B is still a sine wave which has not been shifted in phase with respect to the original wave form A since no phase shift is effected in the signal when it is exactly at the frequency to which the filter 20 is tuned. After the signal passes through the 90° phase shift circuit, however, it will appear as wave form C in FIG. 2A where the sine wave has been retarded by 90°. This wave form (i.e., wave form C), after passing through the Schmitt trigger circuit 30, will appear as wave form D wherein a symmetrical square-wave signal is produced having a frequency equal to that of the original wave form A but shifted in phase with respect to wave form A by 90°. It is this signal which is applied to the phase comparator circuit 36 through capacitor 34.

As was mentioned above, the wave form B is also applied to channel 24 where it passes through bandpass filter 38. For the case assumed where no phase shift occurs in passing through filter 20, no phase shift will occur in filter 38 either since it is tuned to the same frequency as filter 20. Consequently, the wave form E appearing at the output of the bandpass filter 38 will be a sine wave which is locked in phase with respect to the original sine wave A. This signal, after passing through the Schmitt trigger multivibrator circuit 40 and phase splitter 42 produces two square-wave signals F and G which are shifted in phase with respect to each other by 180°. The square-wave signal F, it will be noted is symmetrical and also locked in phase with respect to the original wave form A.

For the case assumed where the wave form A is exactly at the frequency to which the bandpass filters 20 and 38 are tuned, the wave form $H_1$ will appear on lead 84. This is derived as follows: At 0°, for example, the voltage at D is minus one volt whereas the voltage at F is plus two volts. Consequently, the diode 76 will not conduct. The voltage at G is minus two volts while that at D is minus one volt with the result that the diode 74 also does not conduct. This means, in effect, that the voltage output at H will be the same as that at D, or minus one volt. At 90°, the voltage at D changes to plus one volt, but since the voltage at F is still plus two volts the diode 76 will not conduct. The voltage at G is still minus two volts and with that at D equal to plus one volt, the diode 74 will also not conduct with the result that the output voltage $H_1$ is still equal to D or plus one volt. At 180°, however, the voltage at D is plus one volt while that at F is minus two volts meaning that the diode 76 conducts with a voltage drop thereacross equal to minus one volt, i.e., $(+1)+(-2)=(-1)$. At the same time, since the voltage at G is now plus two volts while that at B is only plus one volt the diode 74 also conducts with a total voltage drop thereacross of plus three volts, i.e., $(+1)+(+2)=(+3)$. The voltage at H is thus equal to minus one volt plus three volts or plus two volts, i.e., $(-1)+(+3)=(+2)$. By constructing the wave form $H_1$ by this type of analysis at various points along its cycle, it will be seen that a symmetrical shape is formed with the area above the zero axis being equal to that beneath the zero axis. Consequently, there will be no resultant or cumulative direct current voltage on lead 84 to vary the firing level of triodes 92. The wave form J, it will be noted, comprises the sawtooth wave form mentioned above, with the normal or quiescent firing level of triode 92 being indicated by level 116. Thus, the Schmitt trigger multivibrator 75 will fire at approximately 180° and 540° to produce wave form K which is applied to the differentiator 106. The output of differentiator 106, in turn, will appear as wave form L and comprises a series of sharp voltage spikes which occur at the 180° and 540° marks for the example given.

Reverting again to the wave form A, when the frequency of the input signal has shifted slightly from that to which the bandpass filter 20 is tuned, it may appear as the dotted outline in FIG. 2A. After passing through the bandpass filter 20, it will be shifted in phase by 45° (for example) and will appear as wave form B. That is, it will lag the original wave form A by 45°. After passing through the 90° phase shift circuit 26, however, it will appear as wave form C wherein it lags the original wave form A by 45°. This signal, in turn, is used to fire the Schmitt trigger multivibrator 30 which produces the dotted line wave form D as shown. The dotted line wave form B, after passing through the bandpass filter 38, will appear as wave form E wherein a second phase shift of 45° is effected so that the dotted line wave form E now leads the original dotted line wave form A by 90°. This wave form E produces the dotted line wave forms F and G which, when applied to circuit 36 in combination with dotted line wave form D will produce the wave form $H_2$. Wave form $H_2$ can be derived by a voltage analysis similar to that used in connection with the derivation of wave form $H_1$. It will be noted that the wave form $H_2$ in this case is not symmetrical and that the area above the zero axis is greater than that below the zero axis. Consequently, a positive direct current component will appear on lead 84 which shifts the firing level 116 upwardly to level 116' as shown by the waveform J. At the same time, since the sawtooth wave form at the output of cathode follower 70 is locked in phase with respect to dotted line wave form E, it is shifted by 90° from the original dotted line wave form A. Since the firing level 116', however, has been shifted upwardly, the triode 92 still fires at 180° and 540° as in the previous case with the result that the positive spiked pulses in wave form L which are used to fire the thyratron have the same phase relationship with respect to the original alternating current signal A as they did in the case where no phase shift occurred in the signal in passing through bandpass filters 20 and 38.

It can thus be seen that the present invention provides means for compensating for a shift in phase of the alternating current signal in passing through the bandpass filter 20 due to variations in the frequency of rotation of the crankshaft 114. That is, the pulses applied to the stroboscopic lamp 110 will have a frequency corresponding to that of the alternating current signal A with the pulses in the pulsed signal always being fixed in phase with respect to that alternating current signal regardless of variations in the frequency of the alternating current signal.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In vibration analyzing apparatus of the type adapted to produce an alternating current signal having a fundamental frequency equal to that of a vibrating member and including bandpass filter means through which the alternating current signal passes in order to eliminate all signals other than those due to the fundamental frequency of a single vibrating member; the combination of means for compensating for a shift in phase of the alternating current signal in passing through said bandpass filter means due to variations in the frequency of vibration of said single member, comprising a pair of signal channels coupled to the output of said bandpass filter means, means in one of said channels for producing a first square-wave signal, means in said second channel for producing second and third square-wave signals which are shifted in phase with respect to each other by 180° and shifted in phase with respect to said first square-wave signal in an amount dependent upon the shift in phase of the alternating current signal in passing through the bandpass filter means, means for producing a sawtooth wave form, and means responsive to said first, second and third square-wave signals as well as said sawtooth wave form for producing a pulsed signal having a frequency corresponding to that of the alternating current signal with the pulses in said pulsed signal being fixed in phase with respect to said alternating current signal regardless of variations in the frequency of the alternating current signal.

2. In vibration analyzing apparatus of the type adapted to produce an alterating current signal having a frequency equal to that of a vibrating member and including bandpass filter means through which the alternating current signal passes in order to eliminate all signals other than those due to a single vibrating member; the combination of means for compensating for a shift in phase of the alternating current signal in passing through said bandpass filter due to slight variations in the frequency of vibration of said single member, comprising a pair of signal channels coupled to the output of said bandpass filter means, means in one of said channels for producing a first symmetrical square-wave signal having a frequency equal to said alternating current signal and which is shifted in phase with respect to the signal at the output of said bandpass filter means by 90°, means in said second channel for producing second and third symmetrical square-wave signals each having a frequency equal to said alternating current signal, the second square-wave signal being shifted in phase with respect to said alternating current signal in an amount dependent upon the shift in phase of the alternating current signal in passing through the bandpass filter means and the third square-wave signal being shifted in phase with respect to the second square-wave signal, means coupled to said second channel for producing a sawtooth wave form, and means responsive to said first, second and third square-wave signals as well as said sawtooth wave form for producing a pulsed signal having a frequency corresponding to that of the alternating current signal with the pulses in said pulsed signal being fixed in phase with respect to said alternating current signal regardless of variations in the frequency of the alternating current signal.

3. In vibration analyzing apparatus of the type adapted to produce an alternating current signal having a frequency equal to that of a vibrating member and including bandpass filter means through which the alternating current signal passes in order to eliminate all signals other than those due to a single vibrating member; the combination of means for compensating for a shift in phase of the alternating current signal in passing through said bandpass filter means due to variations in the frequency of vibration of said single member, comprising a pair of signal channels coupled to the output of said bandpass filter means, means in one of said channels for producing a first symmetrical square-wave signal having a frequency equal to said alternating current signal and which is shifted in phase by 90° with respect to the signal at the output of said bandpass filter means, means in said second channel for producing second and third symmetrical square-wave signals each having a frequency equal to said alternating current signal, the second square-wave signal being shifted in phase with respect to said alternating current signal by an amount equal to twice the phase shift effected by said bandpass filter means and the third square-wave signal being shifted in phase with respect to the second square-wave signal by 180°, means responsive to a signal in phase with said second square-wave signal for producing a sawtooth wave form, and means responsive to said first, second and third square-wave signals as well as said sawtooth wave form for producing a pulsed signal having a frequency corresponding to that of the alternating current signal with the pulses in said pulsed signal being fixed in phase with respect to said alternating current signal regardless of variations in the frequency of the alternating current signal.

4. In vibration analyzing apparatus of the type adapted to produce an alternating current signal having a frequency equal to that of a vibrating member and including bandpass filter means through which the alternating current signal passes in order to eliminate all signals other than those due to a single vibrating member; the combination of means for compensating for a shift in phase of the alternating current signal in passing through said bandpass filter means due to variations in the frequency of vibration of said single member, comprising a pair of signal channels coupled to the output of said bandpass filter means, means in one of said channels for producing a first symmetrical square-wave signal having a frequency equal to said alternating current signal and which is shifted in phase with respect to the signal at the output of said bandpass filter means by 90°, means in said second channel for producing second and third symmetrical square-wave signals each having a frequency equal to said alternating current signal, the second square-wave signal being shifted in phase with respect to said alternating current signal in an amount equal to twice the phase shift effected by said bandpass filter means and the third square-wave signal being shifted in phase with respect to the second square-wave signal by 180°, means coupled to said second channel for producing a sawtooth wave form, means responsive to said first, second and third square-wave signals as well as said sawtooth wave form for producing a direct current control voltage which varies in magnitude as a function of the phase shift effected by said bandpass filter means, and means responsive to said direct current voltage for producing a pulsed signal having a frequency corresponding to that of the alternating current signal with the pulses in said pulsed signal being fixed in phase with respect to said alternating current signal regardless of variations in the frequency of the alternating current signal.

5. The combination of claim 4 wherein the means for producing a direct current voltage includes first, second and third input terminals adapted for connection to said first, second and third square-wave signals respectively, a first unidirectional current device having its anode connected to said first input terminal and its cathode connected to the second input terminal, a second unidirectional current device having its anode connected to said third input terminal and its cathode connected to said first input terminal, and impedance elements connecting the first input terminal with the second and third input terminals.

6. The combination of claim 4 and including a stroboscopic lamp, and means for firing said stroboscopic lamp in response to the leading edges of the pulses in said pulsed signal.

7. In vibration analyzing apparatus of the type adapted to produce an alternating current signal having a frequency equal to that of a vibrating member and including bandpass filter means through which the alternating current signal passes in order to eliminate all signals other than those due to a single vibrating member; the combination of means for compensating for a shift in phase of the alternating current signal in passing through said bandpass filter means due to variations in the frequency of vibration of said single member, comprising a pair of signal channels coupled to the output of said bandpass filter means, one of said channels including a 90° phase shift circuit and multivibrator means for generating a first symmetrical square-wave signal having a phase corresponding to the phase of the signal at the output of said 90° phase shift circuit, the other of said channels including second bandpass filter means having the same characteristics as said first-mentioned bandpass filter means and multivibrator means for generating a second symmetrical square-wave signal having a phase corresponding to the phase of the signal at the output of said second bandpass filter means, phase splitting means responsive to said second square-wave signal for producing a third symmetrical square-wave signal having a phase which is the same as that of the signal applied to the phase splitting means and a fourth symmetrical square-wave signal having its phase shifted 180° from said third signal, means responsive to said third and fourth square-wave signals as well as the first square-wave signal for producing a direct current control signal which varies as a function of the phase shift effected by the first-mentioned bandpass filter means, and a device responsive to said control signal for producing a pulsed signal in which each pulse is fixed in phase with respect to said alternating current signal and has a frequency corresponding to that of the vibrating member regardless of any phase shift effected in the alternating current signal in passing through the first-mentioned bandpass filter means.

8. In vibration analyzing apparatus of the type adapted to produce an alternating current signal having a frequency equal to that of a vibrating member and including bandpass filter means through which the alternating current signal passes in order to eliminate all signals other than those due to a single vibrating member; the combination of means for compensating for a shift in phase of the alternating current signal in passing through said bandpass filter means due to variations in the frequency of vibration of said single member, comprising a pair of signal channels coupled to the output of said bandpass filter means, one of said channels including a 90° phase shift circuit and a Schmitt trigger multivibrator circuit for generating a square-wave signal having a phase corresponding to the phase of the signal at the output of said 90° phase shift circuit, the other of said channels including second bandpass filter means tuned to the same frequency as said first-mentioned bandpass filter means and a Schmitt trigger multivibrator circuit for generating a square-wave signal having a phase corresponding to the phase of the signal at the output of said second bandpass filter means, phase splitting means responsive to said last-mentioned square-wave signal for producing one square-wave signal having a phase which is the same as that of the signal applied to the phase splitting means and another square-wave signal having a phase shifted 180° from said first signal, means responsive to said last-mentioned square-wave signals as well as the square-wave output of said first-mentioned Schmitt trigger multivibrator circuit in the first signal channel for producing a control signal which varies as a function of the phase shift effected by the bandpass filter means, and a device responsive to said control signal for producing a pulsed signal, the pulses in said pulsed signal being fixed in phase with respect to said alternating current signal regardless of variations in the frequency of said alternating current signal.

9. In vibration analyzing apparatus of the type adapted to produce an alternating current signal having a frequency equal to that of a vibrating member and including bandpass filter means through which the alternating current signal passes in order to eliminate all signals other than those due to a single vibrating member; the combination of means for compensating for a shift in phase of the alternating current signal in passing through said bandpass filter means due to variations in the frequency of vibration of said single member, comprising a pair of signal channels coupled to the output of said bandpass filter means, one of said signal channels including a phase shift circuit for shifting the phase of the signal at the output of said bandpass filter means by 90° and means for generating a symmetrical square-wave signal having a phase corresponding to the phase of the signal at the output of said phase shift circuit, the other of said channels including second bandpass filter means and means for generating a symmetrical square-wave signal having a phase corresponding to the phase of the signal at the output of said second bandpass filter means, phase splitting means responsive to said last-mentioned square-wave signal for producing one square-wave signal having a phase the same as that of the signal applied to the phase splitting means and another square-wave signal having a phase shifted from said one square-wave signal, means responsive to said last-mentioned square-wave signals as well as the square-wave output of said means in the first signal channel for producing a control signal which varies as a function of the phase shift effected by the bandpass filter means, and a device responsive to said control signal for producing a pulsed signal in which each pulse is fixed in phase with respect to said alternating current signal.

10. In vibration analyzing apparatus of the type in which an electromagnetic transducer converts mechanical vibrations into an alternating current signal having a frequency equal to that of the vibrations, the combination of first bandpass filter means tuned to a predetermined frequency, means for applying said alternating current signal to the first bandpass filter means, second bandpass filter means also tuned to said predetermined frequency and coupled to the output of said first bandpass filter means, means for producing a sawtooth wave form which varies in phase as a function of the phase of the signal at the output of said second bandpass filter means, circuit means for producing the leading edge of an output square-wave signal whenever the magnitude of an input signal applied thereto exceeds a predetermined value, means for applying said sawtooth wave form to said circuit means whereby the circuit means will be actuated to produce the leading edge of a square-wave output signal at a point along the voltage rise of said sawtooth wave form, means for varying the point along the voltage rise of the sawtooth wave form at which said circuit means will be actuated as a function of any phase shift effected in said alternating current signal in passing through said first bandpass filter means, and a stroboscopic lamp in the vibration analyzing apparatus actuated by the leading edge of said square-wave signal.

11. In vibration analyzing apparatus of the type in which an electromagnetic transducer converts mechanical vibrations into an alternating current signal having a frequency equal to that of the vibrations, the combination of first bandpass filter means tuned to a predetermined frequency, means for applying said alternating current signal to the first bandpass filter means, second bandpass filter means also tuned to said predetermined frequency and coupled to the output of said first bandpass filter means, means for producing a sawtooth wave form which varies in phase as a function of the phase of the signal at the output of said second bandpass filter means, a Schmitt trigger multivibrator circuit for producing the leading edge of an output square-wave signal whenever the magnitude of an input signal applied thereto exceeds a predetermined value, means for applying said sawtooth wave form to said Schmitt trigger multivibrator circuit whereby the Schmitt trigger multivibrator circuit will be actuated to produce the leading edge of a square-wave output signal at a point along the voltage rise of said sawtooth wave form, means for varying the point along the voltage rise of the sawtooth wave form at which said circuit means will be actuated as a function of any phase shift effected in said alternating current signal in passing through said filter means, and a stroboscopic lamp in the vibration analyzing apparatus actuated by the leading edge of said square-wave signal.

12. The combination of claim 11 wherein the means for varying the point along the voltage rise of the sawtooth wave form at which said circuit means will be actuated as a function of any phase shift effected in the alternating current signal in passing through the first bandpass filter means comprises a first signal channel connected to the output of said first bandpass filter means, a second signal channel connected to the output of said second bandpass filter means, a 90° phase shift circuit and multivibrator means for generating a square-wave signal having a phase corresponding to the phase of the signal at the output of said 90° phase shift circuit included in said first signal channel, the second of said signal channels including multivibrator means for generating a square-wave signal having a phase corresponding to the phase of the signal at the output of said second bandpass filter means, phase splitting means responsive to said last-mentioned square-wave signal for producing square-wave signals having phases shifted with respect to each other, means responsive to the square-wave signals from said second signal channel as well as the square-wave output of said multivibrator means in the first signal channel for producing a direct current control signal which varies as a function of the phase shift effected by the first bandpass filter means, and means for applying said direct current control signal to said Schmitt trigger multivibrator circuit to vary the bias thereon and shift the point along the voltage rise of said sawtooth wave form where the Schmitt trigger multivibrator circuit will fire to produce the leading edge of an output square-wave signal.

13. In apparatus of the type adapted to produce a pulsed output signal in which each pulse is fixed in phase with respect to an alternating current input signal applied thereto and wherein bandpass filter means are included in the apparatus for eliminating signals having a frequency substantially different than that to which the filter is tuned, the combination of means for compensating for a shift in phase of the alternating current signal in passing through said bandpass filter means due to slight variations in the frequency of said alternating current input signal, comprising a pair of signal channels coupled to the output of said bandpass filter means, means in one of said channels for producing a first symmetrical square-wave signal having a frequency equal to said alternating current signal and which is shifted in phase by 90° with respect to the signal at the output of said bandpass filter means, means in said second channel for producing second and third symmetrical square-wave signals each having a frequency equal to said alternating current input signal, the second square-wave signal being shifted in phase with respect to said alternating current input signal by an amount equal to twice the phase shift effected by said bandpass filter means, the third square-wave signal being shifted in phase with respect to the second square-wave signal by 180°, means coupled to said second channel for producing a sawtooth wave form, and means responsive to said first, second and third square-wave signals as well as said sawtooth wave form for producing a pulsed output signal having a frequency corresponding to the frequency of said input alternating current signal and in which each pulse is fixed in phase with respect to said alternating current input signal.

References Cited by the Examiner

UNITED STATES PATENTS

| 2,383,588 | 8/1945 | Bousky | 73—466 |
| 2,802,145 | 8/1957 | Hislop et al. | 73—71.4 X |
| 3,030,813 | 4/1962 | Crawford et al. | 73—466 |
| 3,077,781 | 2/1963 | Silver | 73—465 |

FOREIGN PATENTS 726,107   3/1955   Great Britain.

RICHARD C. QUEISSER, *Primary Examiner.*

JOHN P. BEAUCHAMP, *Examiner.*